United States Patent [19]
Harrington, Jr.

[11] 3,831,498
[45] Aug. 27, 1974

[54] MULTIPLE-PLY BELLOWS
[75] Inventor: Edward F. Harrington, Jr., Louisville, Ky.
[73] Assignee: Chemetron Corporation, Chicago, Ill.
[22] Filed: Apr. 26, 1973
[21] Appl. No.: 354,692

[52] U.S. Cl. .......................... 92/34, 29/423, 285/93
[51] Int. Cl. ................................................ F16j 3/00
[58] Field of Search ....... F01b/19/00; 92/34; 285/93

[56] References Cited
UNITED STATES PATENTS

| | | | |
|---|---|---|---|
| 2,461,414 | 2/1949 | Donner | 285/93 X |
| 2,770,799 | 11/1956 | Horn | 285/93 X |
| 3,232,640 | 2/1966 | Donkle, Jr. | 285/93 |
| 3,299,417 | 1/1967 | Sibthorpe | 29/455 X |
| 3,472,062 | 10/1969 | Owen | 92/34 X |

Primary Examiner—Edgar W. Geoghegan
Assistant Examiner—Abraham Hershkovitz
Attorney, Agent, or Firm—N. M. Esser

[57] ABSTRACT

An end of a bellows having radially spaced inner and outer plies is mounted to a support having a wall and further having a tubular flange extended from the wall and inserted between the plies. Cylindrical weldments, preferably butt weldments, are deposited on the flange to weld the inner and outer plies to the support.

8 Claims, 1 Drawing Figure

PATENTED AUG 27 1974 3,831,498
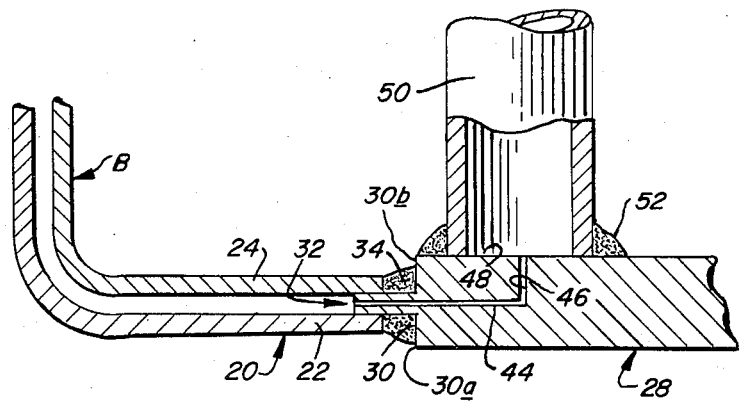

MULTIPLE-PLY BELLOWS

BACKGROUND OF THE INVENTION

This invention pertains to cylindrical bellows commonly employed as expansion joints in various applications. Such bellows, which usually are circular in cross-section, can be employed not only to permit relative movement of the structures to which opposite ends of the bellows are mounted but also to contain various fluids. Such bellows having multiple plies, as are conventional in many applications, additionally can be employed not only to provide multiple fluid-containing barriers but also to facilitate leak detection through known techniques whereby the space between two plies can be maintained at controlled pressure and monitored to detect pressure change indicative of a leak in either ply. Several examples of such bellows having multiple plies and known techniques for leak detection are described in U.S. Pat. Nos. 3,183,022, 3,299,417, 3,472,062, and 3,655,224.

These patents also describe various techniques to mount opposite ends of such bellows to supporting structures. Particularly, FIG. 2 of the U.S. Pat. No. 3,472,062 and FIG. 2 of U.S. Pat. No. 3,655,224 show respective examples in which a circumferential butt weld is deposited on such a tubular supporting structure between each end of the plies of a two-ply bellows and a shoulder on such structure. Similar circumferential butt welds have been found, in extensive testing, to have superior fatigue characteristics when compared to fillet welds. For certain applications, butt welds to weld opposite ends of a pressure-containing ply of a bellows to supporting structures are required effectively under applicable codes (e.g. ASME).

In some installations, supporting structures having suitable shoulders, as in the examples discussed above, may not be available to permit circumferential butt welds to be employed at opposite ends of a multiple-ply bellows. Thus, there remains a need for a new and improved technique for mounting an end of a multiple-ply bellows to supporting structure by satisfactory cylindrical butt weldments.

As also shown in the patents mentioned above, the radially outer ply of two plies of a multiple-ply bellows conventionally is formed with an opening, through which a gauge or other pressure responsive apparatus communicates with the space between the plies. Such opening is difficult to fabricate, particularly if surrounding material of the ply is flared as in U.S. Pat. No. 3,655,224. Such opening also is difficult to align in final assembly, particularly if aligned with an opening in intermediate structure as in U.S. Pat. Nos. 3,299,417 and 3,472,062. Thus, there also remains a need for a new and improved technique for mounting an end of a multiple-ply bellows so as to make suitable provision to connect the space between adjacent plies to a gauge or other pressure responsive apparatus.

SUMMARY OF THE INVENTION

Accordingly, one object of this invention is to provide a new and improved technique for mounting one end of a multiple-ply bellows to a support by satisfactory cylindrical butt weldments. Likewise, another object of this invention is to provide a new and improved technique for mounting tubular means, such as a fitting for a pressure responsive gauge, to communicate with the space between adjacent plies of a multiple-ply bellows.

Broadly, these objects may be attained in a combination comprising a bellows having radially spaced inner and outer plies, a support including a wall, a tubular flange extending from the wall in normal relation to the wall and being inserted between the inner and outer plies, and cylindircal weldments deposited on the flange to weld the inner and outer plies to the support. The combination further may comprise tubular means mounted to the support and connected to the space between the inner and outer plies through a passageway provided in the tubular flange.

One advantage of such combination is that the tubular flange maintains radial spacing between the inner and outer plies. Another advantage of such combination is that such combination permits respective cylindrical butt weldments to be deposited on the tubular flange between adjacent ends of the respective plies and the wall.

These and other objects, features, and advantages of this invention will be evident from the following description, with the aid of the accompanying drawing, of a preferred mode of carrying out this invention.

BRIEF DESCRIPTION OF THE DRAWING

In the drawing, the single FIGURE is a fragmentary sectional view of one end of a two-ply bellows as mounted to a support.

DETAILED DESCRIPTION OF PREFERRED MODE

The single FIGURE of the drawing illustrates a tubular end portion 20 of a bellows B having concentric inner and outer plies 22 and 24 respectively. Preferably, the bellows B is of the type disclosed in copending application Ser. No. 315,259, filed Dec. 14, 1972, and assigned to the assignee of this invention. The plies of a bellows of the type disclosed in said application are in radial registry with each other along a series of circumferential convolutions. Furthermore, as disclosed in said application, an intermediate ply is removed, after the inner, intermediate, and outer plies of a bellows have been sectioned into longitudinal sections to provide, between the inner and outer plies to be re-formed as intact plies from appropriate sections welded together, radial spacing approximately equal to the thickness of the intermediate ply.

The tubular end portion 20 is mounted, in a manner to be described, to a tubular supporting structure 28 generally similar in its function to the respective tubular nipples described in U.S. Pat. No. 3,655,229, and other structures to which opposite ends of a bellows can be mounted. As described in said patent and other patents mentioned above, the space between the plies 22 and 24 may be maintained at controlled pressure and monitored to detect pressure change indicative of a leak in either ply.

One edge 30 of the tubular supporting structure 28 forms a wall disposed radially relative to the bellows B. The tubular supporting structure includes a flange 32 extended from the wall formed by the edge 30, in normal relation to the wall formed by the edge 30, between radially inner and outer surface portions 30a and 30b respectively of the wall formed by the edge 30. The flange 32 has radial thickness approximately equal to, but slightly less than, radial spacing between the plies 22 and 24. The flange 32 is inserted between the plies 22 and 24 with suitable spacing between adjacent edges of the respective plies and the edge 30 for butt weldments to be deposited therebetween.

A circumferential butt weldment 34 is deposited on the radially inner surface 36 of the flange 32 between the adjacent annular edge 38 of the radially inner ply 22 and surface portion 30a. A circumferential butt weldment 38 is deposited on the radially outer surface 40 of the flange 32 between the adjacent annular edge 42 of the radially outer ply 26 and surface portion 30b.

A bore 44, which extends axially through the tubular flange 32 and further into the tubular supporting structure 28, communicates with the space between the plies 22 and 24. A bore 46, which extends radially into the tubular supporting structure 28 from a radially outer surface 48 of such structure 28, intersects the bore 44 and thus communicates with such space. A tubular pressure fitting 50 is mounted on the surface 48 by a circumferential fillet weldment 52. The fitting 50 communicates with the space between the plies 22 and 24 through the bores 44 and 46.

Suitable pressure responsive apparatus (not shown), such as a gauge, may be mounted on the fitting 50 and connected to the space between the plies 22 and 24 through the bore 44, the bore 46, and the fitting 50. Thus, in known manner, such space may be maintained at controlled pressure and monitored to detect pressure change indicative of a leak in either ply.

I claim:

1. A combination comprising a bellows including radially spaced inner and outer plies, a support for one end of said bellows, said support including a wall, a tubular flange extending from said wall in normal relation to said wall, said flange being inserted between said inner and outer plies, and cylindrical weldments deposited on said flange to weld said inner and outer plies to said support.

2. The combination of claim 1 wherein said weldments comprise a cylindrical butt weldment deposited on a radially outer surface of said flange between an edge of said outer ply and said wall.

3. The combination of claim 1 wherein said weldments comprise a cylindrical butt weldment deposited on a radially inner surface of said flange between an edge of said inner ply and said wall.

4. The combination of claim 1 wherein said weldments comprise a cylindrical butt weldment deposited on a radially outer surface of said flange between an edge of said outer ply and said wall and a cylindrical butt weldment deposited on a radially inner surface of said flange between an edge of said inner ply and said wall.

5. The combination of claim 1 wherein a passage extending axially through said tubular flange communicates with a space between said plies.

6. The combination of claim 5 further comprising tubular means mounted to said support and connected to said space through said passage.

7. A combination comprising a bellows including radially spaced inner and outer plies, a support for one end of said plies, said plies being welded to said support by circumferential weldments radially spaced on said support, said support including a passage which extends through said support but not through either ply and which opens between said weldments to communicate with a space between said plies.

8. The combination of claim 7 further comprising tubular means mounted to said support and connected to said space through said passage.

* * * * *